May 22, 1951          H. BRUCK          2,554,170
ELECTRONIC LENS FOR MICROSCOPES
Filed April 15, 1948
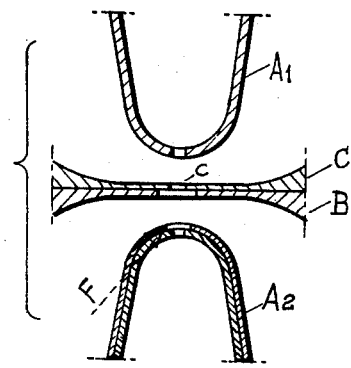
Fig:1
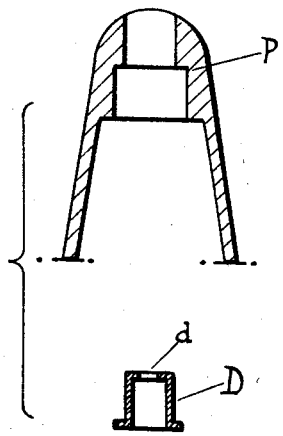
Fig:2
INVENTOR
HENRI BRUCK
By Haseltine Lake + Co
AGENTS Patented May 22, 1951

2,554,170

UNITED STATES PATENT OFFICE 2,554,170

ELECTRONIC LENS FOR MICROSCOPES

Henri Bruck, Paris, France, assignor to Compagnie Generale de Telegraphie Sans Fil, a corporation of France Application April 15, 1948, Serial No. 21,260
In France April 26, 1947

2 Claims. (Cl. 250—49.5)

The present invention relates to devices having an electronic optic serving to converge all the paths of a pencil of electrons in a single point; and it also enables considerably improving the concentration of the said pencil, as well as making its point of convergence as small and well-defined as possible.

The invention is primarily applicable to electronic microscopes and more particularly to those with an electrostatic lens, in which instruments its effect consists in a considerable increase in the power of resolution.

A microscope usually has two lenses, disposed a certain distance from each other, the one nearest the cathode being called the objective and the other the lens of projection. It has been found that various causes, due to imperfections in manufacture and mounting, deform the point of concentration by transforming it into a spot of a pronounced elliptical form. The principal cause of this is the imperfect roundness of the hole in the central electrode of the objective. In order to avoid the said deformation the said hole must be made circular with a precision of the order of $\frac{1}{10}$ of a millimicron, a precision which is not practically realizable with presently known mechanical means. Despite all the precision expended on its realization, it usually remains oval, and brings about an elliptical deformation (effect of astigmatism) which limits the power of resolution.

For the purpose of correcting this elliptical aberration, it has heretofore been proposed to create in the interior of the apparatus, fields of compensation formed by means of supplementary electrodes, disposed outside of the normal lenses, oriented in a particular manner, and receiving a suitable external electrical excitation.

The object of the present invention is to provide an improved method of correction, which does not require a distinct electrical supply, and reduces to a minimum the changes in the construction of the apparatus. The invention is carried out by acting on the existing lenses themselves, by modifying them mechanically in such a manner as to exert on their field an action of deformation which is superposed on and practically eliminates that caused by the imperfections in their construction. This deformation is introduced at a place where an adjustment, which is relatively rough, and hence easy to make, enables correction of the effect of astigmatism due to the ovalization of the hole in the central electrode.

My invention will be more fully understood from the following specification by reference to the accompany drawings which set forth my invention, by way of non-limiting examples, in which:

Figure 1 shows the application of my invention to the correction of the objective; and, Fig. 2 shows the application of my invention to the correction of the lens of projection.

In Fig. 1 there has been denoted by C the central electrode of the lens called the objective, having, in addition, two external electrodes $A_1$ and $A_2$, which are normally raised to a high potential in comparison with the central electrode. The hole in the latter is denoted by $c$. At this place the electronic trajectories are very sensitive to the least imperfection in its circular form. The mechanical alteration according to the invention is made in places of relatively small sensitivity. It is obtained by ovalizing, to a degree and in a direction determined by the amplitude and direction of the elliptical aberration, the holes in the external electrodes $A_1$ and $A_2$. At these places the alteration can be fairly wrought, and in every way well within the limits of precision of mechanical work. In certain cases the correction can be obtained by slitting or deforming one of the external electrodes or else by regulating their mutual clearance. The adjustment of the holes may also be accompanied by a rotation of the electrodes. Finally, there may be introduced into the lens a supplementary piece B in the form of a disk pierced by a central hole $b$ and connected with the central electrode C, and with which the form of the hole is adjusted. The adjustment of the holes $b$ and $c$ can be considerably assured in a progressive and regulable manner by providing, in the body of the electrodes, lodgements into which there can be passed one or more screws whose point appears in the perimeter of the hole, as shown by the arrow F in Fig. 1. These means of regulation can be utilized singly, or else in certain cases, partially or totally combined, as required.

According to the variant of Fig. 2, the correction of the convergence in general and the suppression of the effect of ellipticity in particular are obtained by acting on the lens of projection denoted by P. As in the preceding example it is possible to act directly on the form of its holes by deforming them as desired for the purpose of assuring the desired correction. Preferably, there is employed a movable socket D, which is lodged in a regulable manner in the lens, and pierced with a hole $d$, which is subjected to the necessary alteration.

Regulation by means of the lens of projection is more advantageous from the view point of the precision with which its adjustment should be made. For correcting a given ellipticity of the objective the ellipticity which will have to be given in the sense of compensation to the lens of projection will be greater in the ratio of the square of the enlargement, that is, 2500 to 10,000 times. In this way the correction is assured by an adjustment which is rougher, and hence easier to make.

In altering the lens of projection a compensatory elliptical field is created in the space where the rays of the pencil cross the axis. They are then all affected in the same measure by the correction, even if the intentional deformation of the hole is not strictly elliptical but fairly rectangular.

The correction is preferably carried out according to the following procedure: The sensitivity of the system is first determined by varying the ovalization of the hole in the socket. Calculation shows that, in order to obtain a limit of resolution of approximately 1 millimicron, the central hole of the objective must be round within a precision of approximately 0.2 millimicron, while, for the movable holes of the lens of projection, a precision of 0.1 millimeter is already sufficient. It can readily be obtained by mechanical means. After the system has been calibrated there is measured with a normal movable hole the elliptical defect of the complete system in the observation of images. Finally, the observed defect is corrected, by a single operation, through ovalizing and orienting the mobile hole in accordance with the first two operations.

While I have described my invention in certain of its preferred embodiments I realize that modifications of my invention may be made and I desire that it be understood that no limitations upon my invention are intended other than may be imposed by the scope of the appended claims.

What I claim as new and desire to secure by Letters Patent of the United States is as follows:

1. In an electronic microscope, an electro-static lens using a fixed localized pencil-like beam, comprising two outer electrodes centrally apertured and an inner centrally apertured electrode located therebetween, and formed of a single metallic piece, a centrally apertured supplementary single metallic piece associated with and in direct electrical contact with said inner electrode, said supplementary piece presenting an opening substantially larger than the said aperture in said inner electrode, the latter aperture being situated within the boundary of said opening.

2. An electro-static lens as claimed in claim 1, in which said supplementary piece is a metallic plate fixed directly against the base of the central electrode.

HENRI BRUCK.

REFERENCES CITED

The following references are of record in the file of this patent:

UNITED STATES PATENTS

| Number | Name | Date |
|---|---|---|
| 2,352,043 | Von Ardenne | June 20, 1944 |
| 2,372,443 | Marton | Mar. 27, 1945 |
| 2,455,676 | Hillier | Dec. 7, 1948 |

OTHER REFERENCES

Ser. No. 401,781, Ruska (A. P. C.), published May 25, 1943.